US008229010B2

(12) United States Patent
Adachi et al.

(10) Patent No.: US 8,229,010 B2
(45) Date of Patent: Jul. 24, 2012

(54) OFDM RECEIVING APPARATUS HAVING PLURALITY OF OFDM BRANCHES

(75) Inventors: Naoto Adachi, Kawasaki (JP); Makoto Hamaminato, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 720 days.

(21) Appl. No.: 12/182,546

(22) Filed: Jul. 30, 2008

(65) Prior Publication Data

US 2009/0097577 A1 Apr. 16, 2009

(30) Foreign Application Priority Data

Oct. 10, 2007 (JP) ................................. 2007-263990

(51) Int. Cl.
*H04K 1/10* (2006.01)
(52) U.S. Cl. ........ 375/260; 375/267; 375/340; 375/344; 375/347; 375/349; 455/101; 455/102; 455/132; 455/146
(58) Field of Classification Search .................. 375/260, 375/267, 340, 344, 347, 316, 324, 342, 349, 375/355; 455/101, 102, 132, 146
See application file for complete search history.

(56) References Cited

U.S. PATENT DOCUMENTS

| 7,558,345 B2 * | 7/2009 | Kim et al. ..................... 375/343 |
| 7,577,411 B2 * | 8/2009 | Chang et al. ................ 455/193.1 |
| 2004/0229581 A1 * | 11/2004 | Mizoguchi et al. ........... 455/136 |
| 2005/0163094 A1 * | 7/2005 | Okada et al. .................. 370/343 |
| 2006/0293006 A1 * | 12/2006 | Taniguchi et al. ............ 455/132 |
| 2007/0116140 A1 * | 5/2007 | Sawada ......................... 375/260 |
| 2007/0121491 A1 * | 5/2007 | Kaiki ............................. 370/222 |

FOREIGN PATENT DOCUMENTS

| JP | 4-150320 A | | 5/1992 |
| JP | 2001-168833 A | | 6/2001 |
| JP | 2006-50283 | * | 2/2006 |
| JP | 2006-050283 A | | 2/2006 |
| JP | 2006-325077 A | | 11/2006 |

OTHER PUBLICATIONS

Japanese Office Action mailed Dec. 20, 2011 for corresponding Japanese Application No. 2007-263990, with English-language Translation.

* cited by examiner

*Primary Examiner* — Chieh M Fan
*Assistant Examiner* — Sophia Vlahos
(74) *Attorney, Agent, or Firm* — Fujitsu Patent Center

(57) ABSTRACT

An OFDM signal is demodulated to generate a frequency domain signal in each of a plurality of branches. A diversity combining unit combines the demodulated signals respectively obtained in each of the branches. A clock recovery unit recovers the clock for the OFDM signal. A guard correlation unit detects the phase error of the OFDM signal. A decision unit identifies a branch having high reliability. A clock error correction unit generates a correction instruction, in accordance with the average value of the phase errors in the branch having high reliability. The clock recovery unit in each of the branches respectively corrects the error of the clock in accordance with the correction instruction.

10 Claims, 9 Drawing Sheets

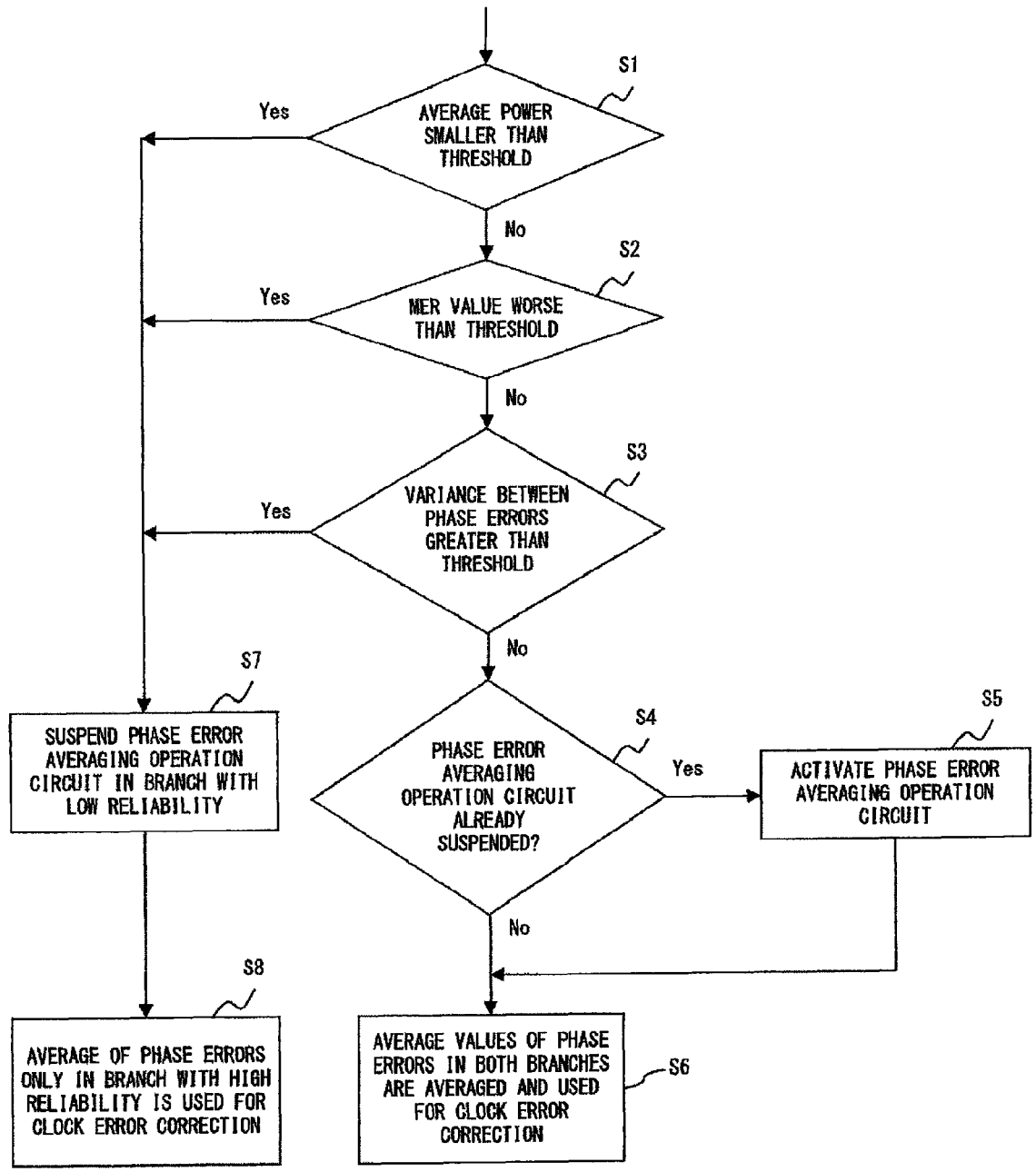
F I G. 8

OFDM RECEIVING APPARATUS HAVING PLURALITY OF OFDM BRANCHES

CROSS REFERENCE TO RELATED APPLICATIONS

This application is based upon and claims the benefit of priority from the prior Japanese Patent Application No. 2007-263990, filed on Oct. 10, 2007, the entire contents of which are incorporated herein by reference.

BACKGROUND OF THE INVENTION

1. Field of the Invention

The prevent invention relates to an OFDM receiving apparatus that receives an OFDM signal using a plurality of OFDM branches.

2. Description of the Related Art

As a digital-signal transmission system, OFDM (Orthogonal Frequency Division Multiplexing) has been proposed and implemented in recent years. In the OFDM system, data is transmitted employing a plurality of carriers that are orthogonal to each other in the frequency domain. For this reason, the symbol period of data transmitted using each of the carriers is longer according to the OFDM system, resulting in less degradation of reception quality even in a multipath environment with large delays. In addition, a different demodulation method can be selected for each of the carriers.

The modulation performed according to the OFDM uses IFFT (Inverse Fast Fourier Transform), and the demodulation uses FFT (Fast Fourier Transform). Therefore, the OFDM system has high frequency efficiency, and its application to digital terrestrial broadcasts has been widely explored. In Japan, the digital terrestrial broadcasting system called ISDB-T (Integrated Services Digital Broadcasting-Terrestrial) has adopted the OFDM.

In the digital terrestrial broadcasting, signals are often received with a mobile station such as a cellular phone terminal. Therefore, diversity reception has been practically used in order to improve the reception quality. Using diversity reception, a plurality of antennas receive identical signals, and the plurality of received signals are combined to remove noises. Alternatively, there is also a known method that involves selecting, from the plurality of received signals, a signal that has been received through an antenna with better reception condition.

FIG. 1 is a diagram showing a general configuration of an OFDM receiving apparatus equipped with diversity reception function. The OFDM receiving apparatus shown in FIG. 1 has two OFDM branches.

Each OFDM branch has an antenna 101. In each OFDM branch, an OFDM signal is received by a tuner 102 and converted into a digital signal by an A/D conversion unit 103. An orthogonal demodulation unit 104 generates orthogonal signals (an I-component signal and a Q-component signal) from the digital signal obtained in the A/D conversion unit 103. An FFT unit 105 converts the signals from the time domain to the frequency domain, by performing FFT calculation for each symbol. A transmission path equalization unit 106 corrects phase rotation occurred in the transmission path.

A diversity combining unit 107 combines a pair of signals output from the transmission path equalization unit 106 in each OFDM branch. The signals are combined in the frequency domain. For this reason, such diversity reception is also called frequency diversity. In addition, selection diversity can be applied instead of the diversity combining. An error correction unit 108 performs error correction for the output signal from the diversity combining unit 107, thereby regenerating the transmitted data.

In the diversity combining configured as described above, output Y of the diversity combining unit 107 is expressed by the equation shown below. In the equation, D1 and D2 represent data output from the transmission path equalization unit 106 in each OFDM branch. P1 and P2 represent power of the SP carrier in each OFDM branch.

$$Y=(P1*D1+P2*D2)/(P1+P2)$$

Diversity combination makes it possible to reduce correlation between branches to improve reception sensitivity, by adjusting, for example, antenna directivity. However, since signals are received from a plurality of paths, severe deterioration in the quality of received signals in one branch could lead to signal degradation in other branches.

An OFDM receiving apparatus having diversity reception function often adopts the master-slave system. An OFDM receiving apparatus adopting the master-slave system is described below, referring to FIG. 2A and FIG. 2B. FIG. 2A and FIG. 2B show the front stage and the subsequent stage of the OFDM receiving apparatus, respectively. The FFT unit is included in both FIG. 2A and FIG. 2B.

As shown in FIG. 2A, a clock recovery unit 111 in each branch recovers the clock for the output signal from the orthogonal demodulation unit 104. A guard correlation unit 112 detects the phase error for each symbol. A phase error averaging unit 113 calculates the average value of the phase errors detected by the guard correlation unit 112. A clock correction unit 114 corrects the error of the clock recovered by the clock recovery unit 111, using the average value of the phase errors. Thus, in an OFDM apparatus adopting the master-slave system, basically the clock is recovered independently at each branch and corrected separately at each branch.

In each branch, the FFT unit 105 and the transmission path equalization unit 106 operate in accordance with the clock recovered in the respective branch. The diversity combining unit 107 operates basically using the clock in either one of the branches. For example, assuming that the first branch is the master, the diversity combining unit 107 operates using a clock 1 recovered in the first branch. For this reason, a clock conversion unit 115 needs to be provided for other branches to perform clock conversion. The clock conversion unit 115 is realized, for example, by implementing a memory to store data, and setting a write clock and a read clock that are different from each other.

Patent Document 1 (Japanese Patent Application Publication No. 2006-50283) describes a configuration in which symbol positions of a first branch and a second branch are detected respectively, and clocks to be used by A/D conversion units of the branches are generated in accordance with the pair of the detection results. In the configuration, a carrier-frequency error correction unit performs the correction separately for each branch.

According to the master-slave system described above, diversity operations are performed in accordance with the clock in the master branch. For this reason, when quality deterioration occurs in the master branch and frame synchronization becomes ineffective, transmitted data cannot be regenerated even if the slave branch maintains good quality. A possible way to solve the problem would be, for example, to employ a configuration in which quality of each branch is monitored and a branch with higher quality is set as the master (in other words, diversity operations are performed using the clock of the branch with higher quality). However, the configuration requires complicated configuration and operations to switch the clocks. In addition, a steep decline of the quality of the master branch causes delay in clock switching and the like, which makes it impossible to receive signals.

According to the configuration described in Patent Document 1, the clock for each branch is recovered on the basis of information detected in each branch. For this reason, if the configuration described in Patent Document 1 is applied to a circuit for correcting a clock recovered from a received OFDM signal, a steep decline in quality of a branch would cause quality of other branches to decline as well. In addition, reception characteristics also deteriorate, when the phase error at each branch largely fluctuates due to factors such as a multipath environment, or when the control method for the FFT window is changed because of, for example, presence of a preceding wave.

SUMMARY OF THE INVENTION

A disclosed OFDM receiving apparatus includes: a plurality of antennas; receiving systems respectively connected to each of the antennas; clock signal control units for respectively correcting a clock signal in each of the receiving systems; operation units for obtaining, in each of the receiving systems, a time phase error between a symbol starting position and a position of a reference clock signal and for obtaining an average value of the time phase errors in each of the receiving systems; and a decision unit for combining the average values obtained by the operation units in the receiving systems, wherein the decision unit controls the clock signal control units to correct the clock signal in each of the receiving systems.

Another disclosed OFDM receiving apparatus, that receives an OFDM signal using a plurality of OFDM branches, includes: a plurality of clock circuits for respectively generating a clock for the OFDM signal in each of the OFDM branches; a detector for detecting an error in a symbol interval in each of the OFDM branches; an identification unit for identifying, from the plurality of the OFDM branches, an OFDM branch that satisfies a predetermined communication condition; a correction unit for correcting, in accordance with the error in the symbol interval detected in one or more OFDM branches identified by the identification unit, a clock generated by each of the plurality of clock circuits; and a diversity circuit for combining output signals from the plurality of the OFDM branches.

BRIEF DESCRIPTION OF THE DRAWINGS

FIG. 8 is a flowchart illustrating processes performed by a decision unit.

DESCRIPTION OF THE EMBODIMENTS

Figure 1:
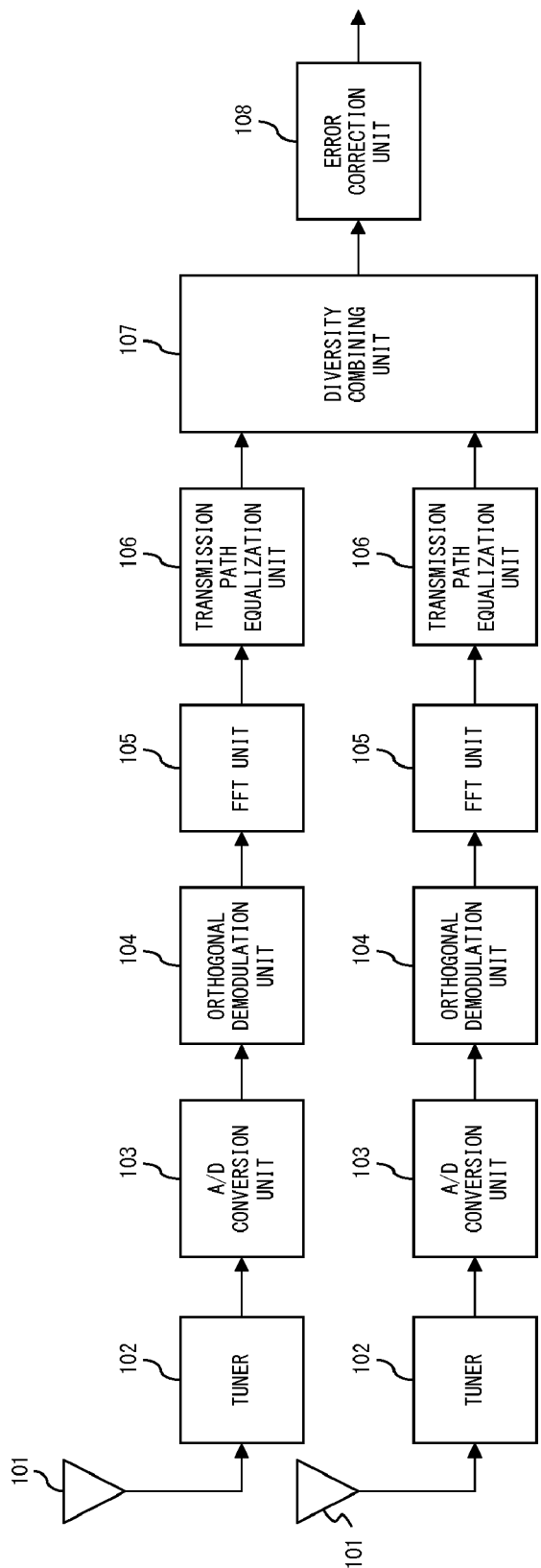
FIG. 1 is a diagram showing a general configuration of an OFDM receiving apparatus having diversity reception function.
Figure 2A:
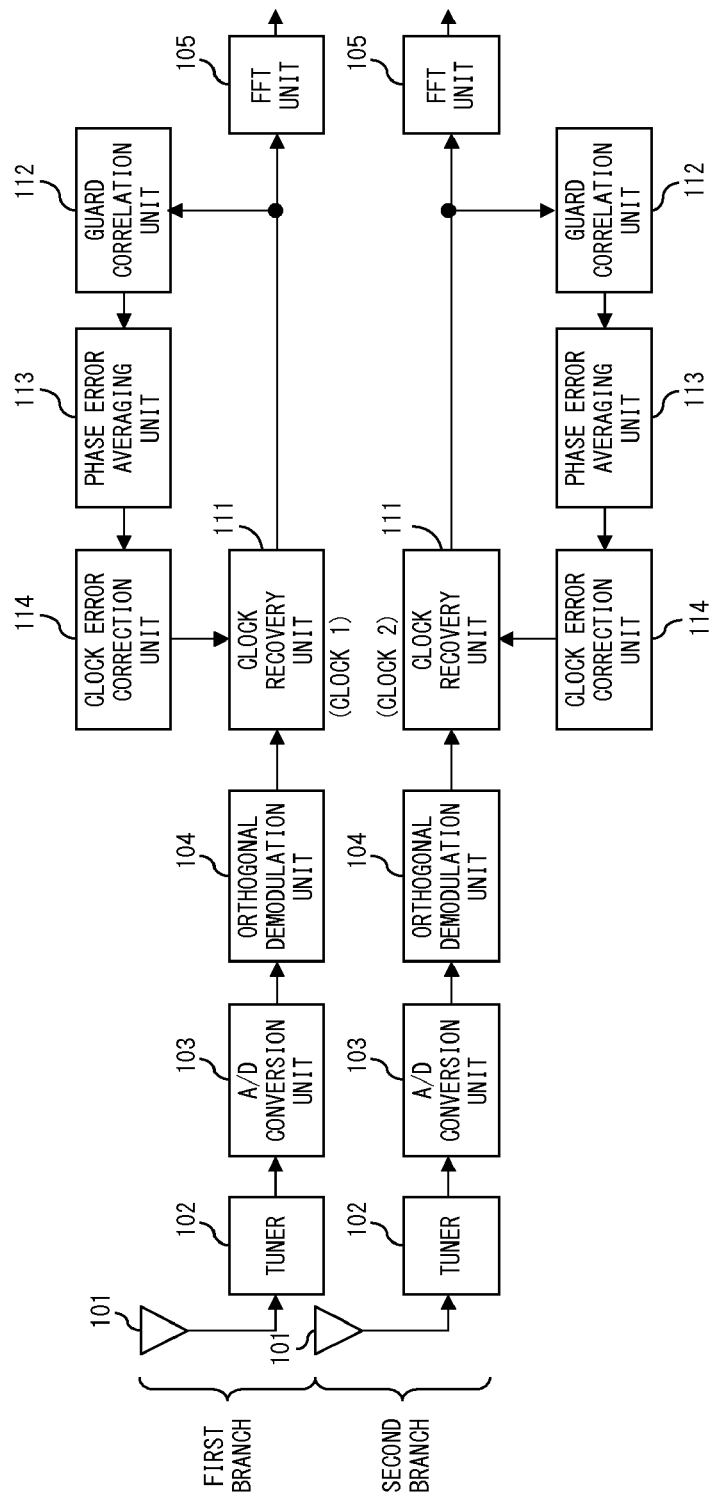
FIG. 2A and FIG. 2B are diagrams showing a configuration of an OFDM receiving apparatus adopting the master-slave system.
Figure 2B:
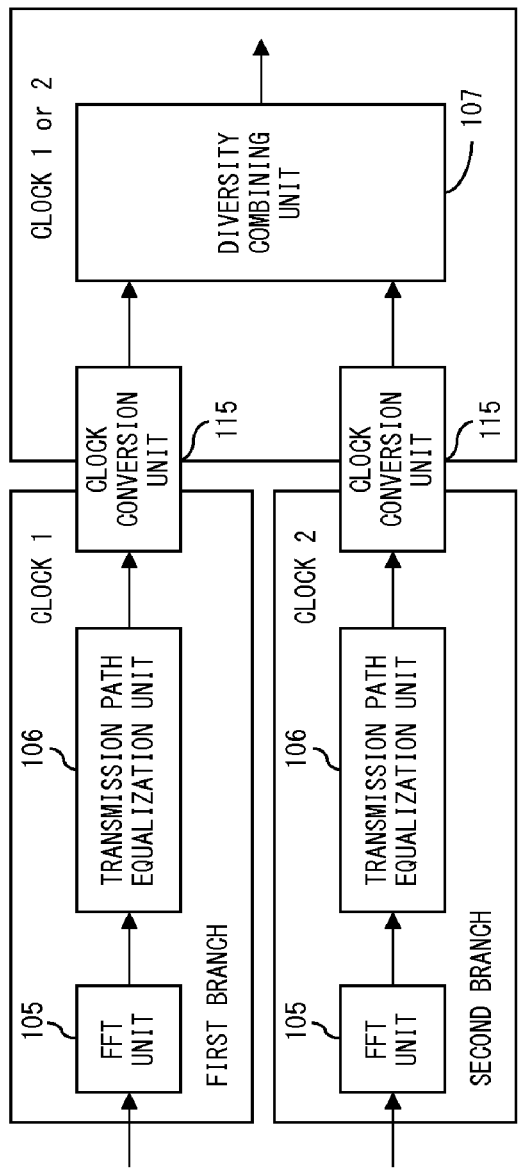
Figure 3:
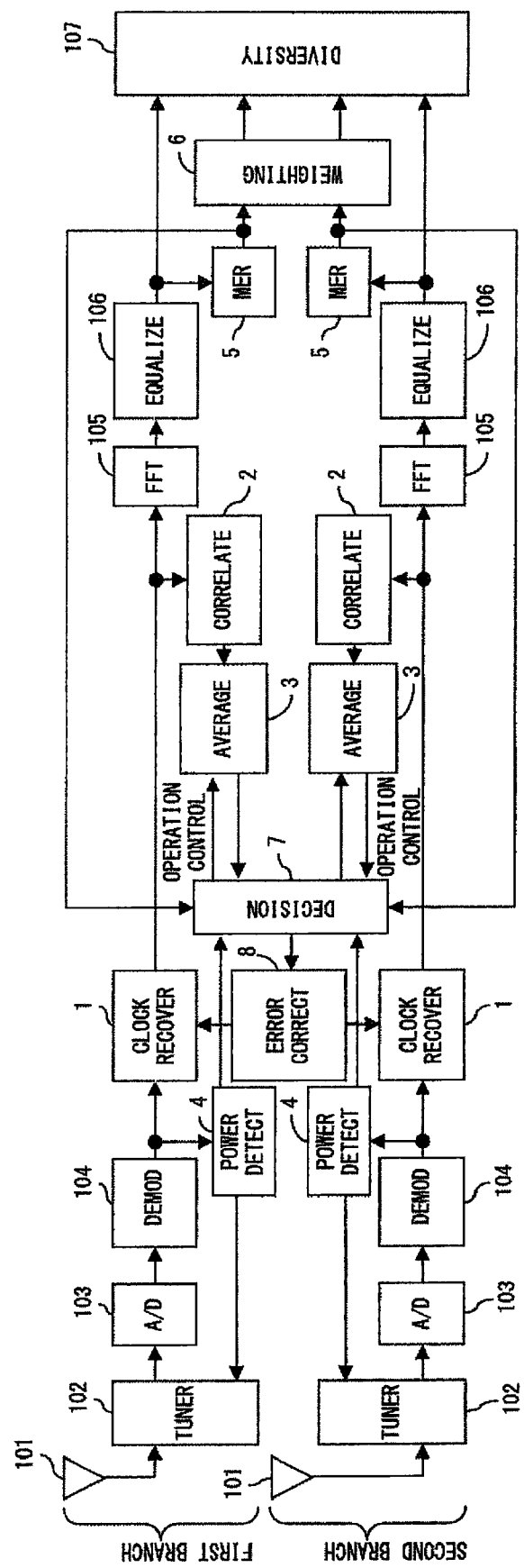
FIG. 3 is a diagram showing a configuration of an OFDM receiving apparatus according to an embodiment.

FIG. 3 is a diagram showing a configuration of an OFDM receiving apparatus according to an embodiment. While the OFDM receiving apparatus in this embodiment is configured to receive an OFDM signal using two OFDM branches (a first branch and a second branch), the number of the OFDM branches is arbitrary.

Each of the branches includes, in order to receive and demodulate an OFDM signal, an antenna 101, a tuner 102, an A/D conversion unit 103, an orthogonal demodulation unit 104, an FFT unit 105, and a transmission path equalization unit 106. Signals in the frequency domain obtained respectively in each of the branches by demodulating an OFDM signal are combined by a diversity combining unit 107 to regenerate the transmitted data. Although an error correction circuit is disposed in the output side of the diversity combining unit 107, the error correction circuit is omitted in FIG. 3.

Figure 4:
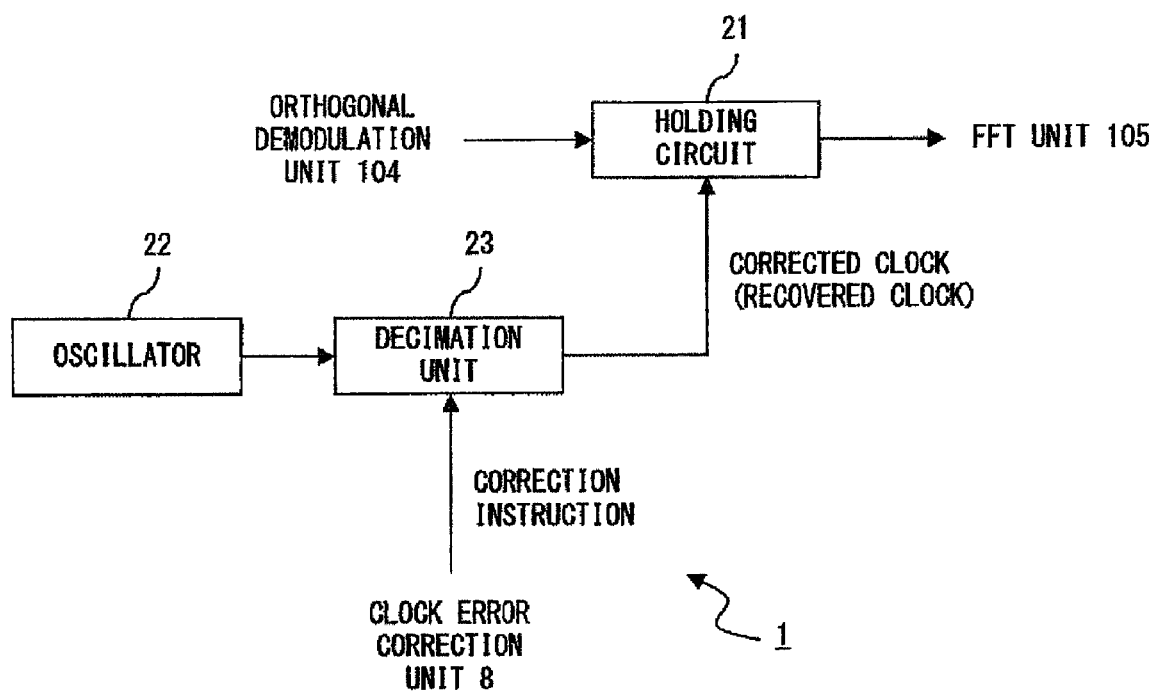
FIG. 4 is a diagram showing an example of a configuration of a clock recovery unit.

A clock recovery unit 1 recovers the clock of an output signal from the orthogonal demodulation unit 104. The clock recovery unit 1 includes, for example, as shown in FIG. 4, a holding circuit 21 for holding the output signal (data stream) from the orthogonal demodulation unit 104. An oscillator 22 generates a clock having a predetermined frequency. A decimation unit 23 decimates the pulses of the clock generated by the oscillator 22, in accordance with a correction instruction given by a clock error correction unit 8. Thus, a correct clock is generated, with the error (for example, a frequency error) of the clock having been corrected in accordance with the correction instruction. In other words, the clock is recovered. Then, the data held in the holding circuit 21 is read out in accordance with the corrected clock. The data read out from the holding circuit 21 may be interpolated by, for example, an FIR filter and the like.

The oscillator 22 may be implemented in each of the branches. In this case, the respective oscillation frequencies of the oscillators 22 may be identical to each other. Alternatively, the first branch and the second branch may share the oscillator 22.

A guard correlation unit 2 detects the symbol interval of the OFDM signal. A method for detecting the symbol interval is described below, referring to FIG. 5. It has been well known that, in the OFDM system, a guard interval is inserted between symbols. The guard interval is generated by copying information in a tail area of a corresponding symbol. While there is no particular limitation, a length of the guard interval is ⅛ of the symbol period, according to mode 3 of the ISDB-T standard.

In order to detect the symbol interval, the correlation between an OFDM signal output from the orthogonal demodulation unit 104 and a signal that corresponds to the OFDM signal having a delay is obtained first. The delay time is one symbol period. Then, the moving average of the correlation values of the signals are calculated. The moving range for the calculation of the moving average corresponds to, for example, the guard interval.

Figure 5:
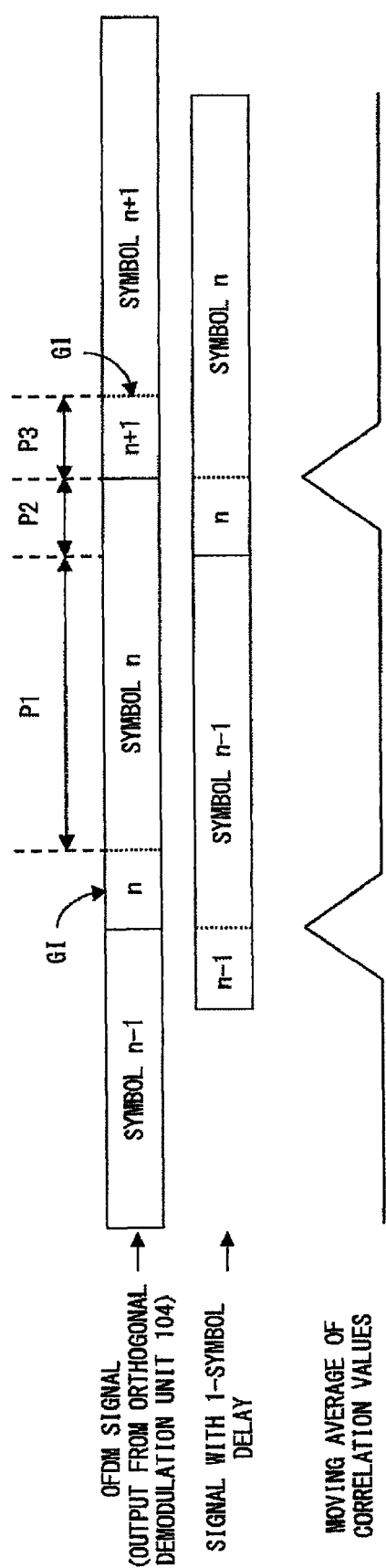
FIG. 5 is a diagram illustrating a method for detecting a symbol interval.

In FIG. 5, the correlation between a symbol n and a symbol n−1 is calculated during a period P1. In this case, the correlation is small. During a period P2, the correlation between the symbol n and a guard interval n is calculated. At this time, the signal of the guard interval n is obtained by copying the signal of the symbol n. In other words, the correlation between the symbol n and the symbol n is calculated during the period P2, resulting in a large correlation. Therefore, the moving average of the correlation values gradually increases during the period P2. During a period P3, the correlation between a guard interval n+1 and the symbol n is calculated, resulting in a small correlation. Therefore, the moving average gradually decreases during the period P3. As a result, the moving average of the correlation values peaks at the timing when the period shifts from P2 to P3.

Thus, the moving average of the correlation values peaks at the timing corresponding to the boundary between the symbols of the OFDM signal. Therefore, the peak occurs at intervals corresponding to "symbol period+guard interval (symbol interval)".

Figure 6:
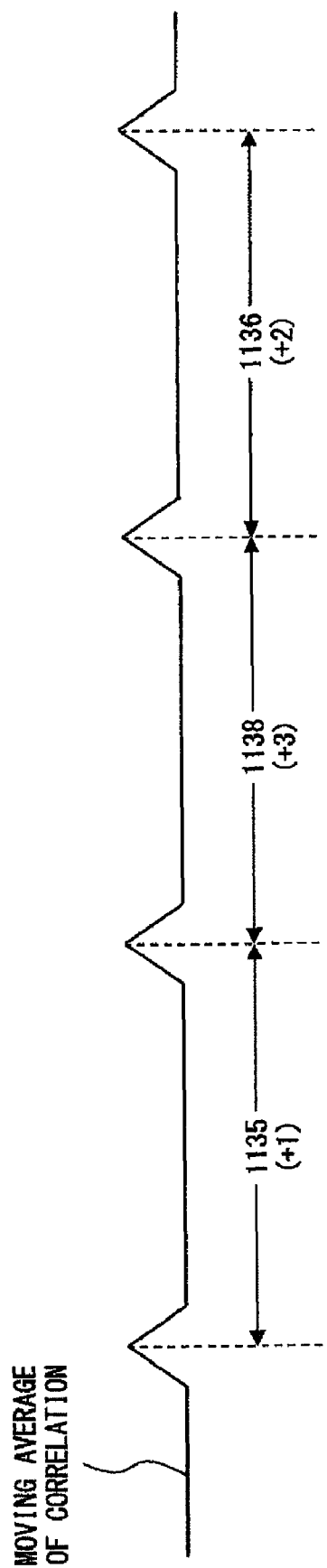
FIG. 6 is a diagram illustrating calculation of the average of errors.

A phase error averaging unit 3 calculates the average of the errors between the actual symbol interval and the detected symbol interval. The calculated average of the errors is notified to a decision unit 7. The method for calculating the average of the errors is described above, referring to FIG. 6. In FIG. 6, the actual symbol period is assumed to be 1008μ seconds, and the guard interval is assumed to be ⅛ symbol period (that is, 126μ seconds). Therefore, the actual symbol interval is assumed to be 1134μ seconds.

The symbol interval is detected by the guard correlation unit 2 for each symbol. The detected symbol intervals are, as shown in FIG. 6, "1135", "1138", "1136" . . . . In this case, the errors are "+1", "+3", "+2", respectively. Therefore, the average of the errors is "+2". Note that the period for calculating the average value is not limited to a particular duration.

An power detection unit 4 detects the average power of the output signals from the orthogonal demodulation unit 104. In this regard, the output signals from the orthogonal demodulation unit 104 are an I component signal and a Q component signal. Therefore, the electric power of the output signals from the orthogonal demodulation unit 104 can be obtained as "the square value of the I component+the square value of the Q component ($I^2+Q^2$)". The power detection unit 4 notifies the decision unit 7 of the calculated average power value. Meanwhile, the power detection unit 4 may be used in an AGC feedback system that controls the RF gain in the tuner 101.

An MER (Modulation Error Rate) calculation unit 5 detects the MER of frequency-domain signals output from the transmission path equalization unit 106. The detected MER value is notified to the decision unit 7. The detected MER value is also notified to a weighting unit 6. The weighting unit 6 controls the weights applied when the diversity combining unit 107 combines the data from each of the branches, in accordance with the respective MER values of the branches. If the MER of a branch severely deteriorates, the diversity combining unit 107 may determine not to use the data output from the deteriorated deterioration.

The phase error, the average power, and the MER value in each of the branches are notified to the decision unit 7. In accordance with the notification, the decision unit 7 identifies a branch having high reliability. The phase errors detected in the branch with high reliability are used for combining. In this example, "combining" refers to an operation to calculate an average value. For example, when both of the first and second branches have high reliability, the average value of the phase error detected in the first branch and the phase error detected in the second branch is calculated and output. When the first branch has high reliability and the second branch has low reliability, for example, the phase error detected in the first branch is output without any change.

A clock error correcting unit 8 generates a correction instruction for correcting the error of a clock (for example, a frequency error) according to the output from the decision unit 7. The correction instruction is for reducing (or for minimizing) the error of the clock, which is given to the clock recovery unit 1 in the first branch and the second branch. The clock recovery unit 1 in each of the branches decimates the pulses of the clock, in the proportion according to the correction instruction, thereby correcting the error of the clock. Meanwhile, whether to increase or to decrease the frequency of the clock is determined on the basis of the polarity of the error (in other words, whether the detected symbol interval is longer or shorter than the actual symbol interval).

As described above, in the OFDM receiving apparatus according to the embodiment, the error of the clock in each branch is corrected using the correction instruction generated by combining (in the example, by averaging) the error information obtained from each branch. This enables stable clock correction. That is to say, the clock in each branch is stabilized and the reception quality is improved.

In addition, since obtaining the average of the error information does not limit or affect the control of the FFT window position, the combination of the data is easy.

Furthermore, when reliability of one of the plurality of branches decreases, the error information of the branch is excluded from the generation of the correction instruction. Therefore, the error of the clock can be corrected appropriately, without being affected from the branch having low reliability.

In the OFDM receiving apparatus configured as described above, upon making a decision that the reliability of a branch is low, the decision unit 7 instructs the phase error averaging unit 3 in the branch to hold the last calculated average value. The value being held is used when the reliability of the branch recovers. Meanwhile, the quality (the variance between the phase errors, the power, the MER etc.) of each branch is assumed to be monitored constantly. Hereinafter, the operations performed upon decline of reliability are described, referring to FIG. 7.

Figure 7:
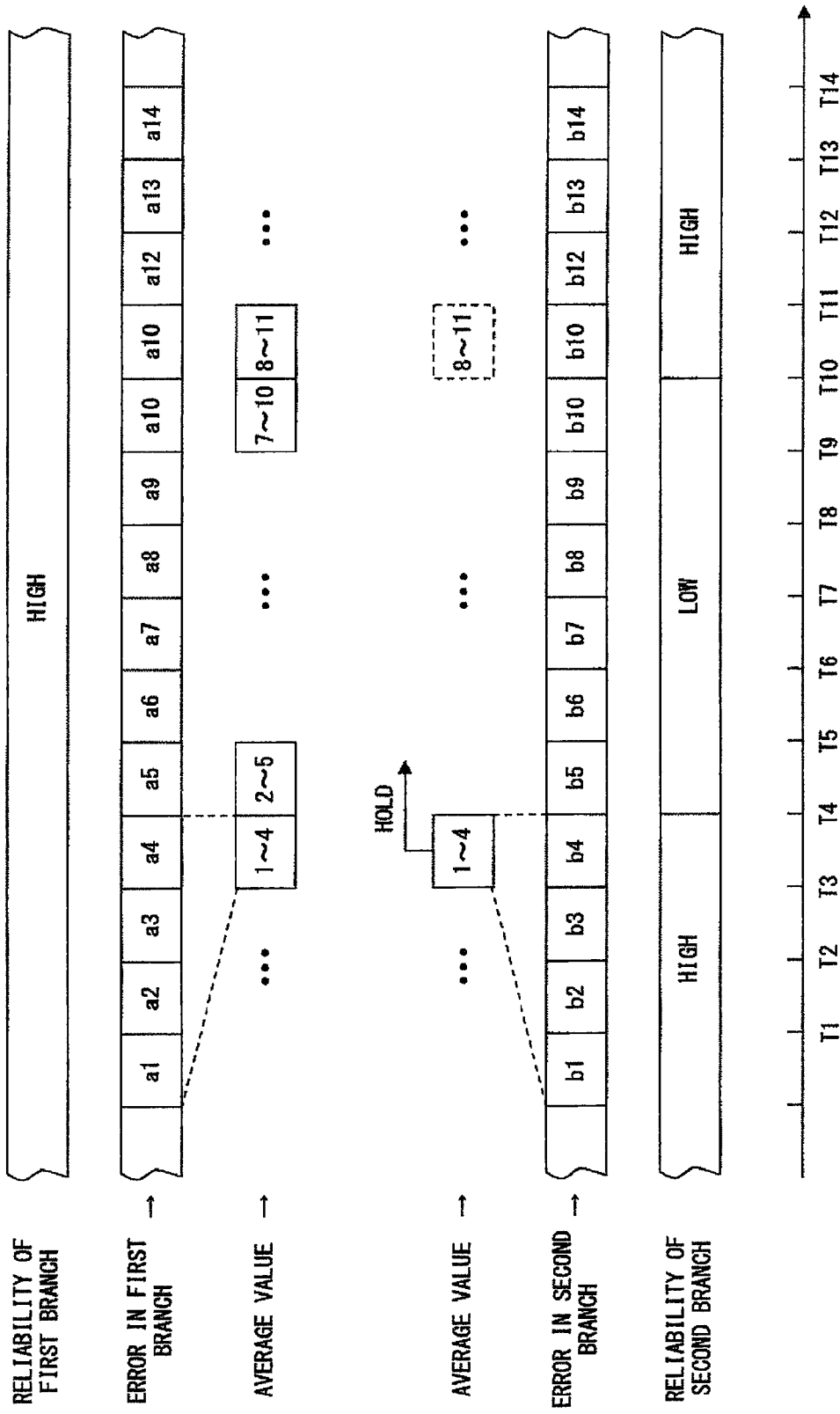
FIG. 7 is a diagram illustrating operations performed when reliability of a branch declines.

In FIG. 7, a1-a14 represent phase errors in the first branch that are detected at times T1-T14, and b1-b14 represent phase errors in the second branch that are detected at the times T1-T14. The reliability of the first branch is assumed to be constantly high at the times T1-T14. On the other hand, the reliability of the second branch is assumed to be low at the times T5-T10.

In this example, average is calculated from four values. For example, at the time T4, the average value of the phase errors in the first branch is obtained as "P (a1-a4)" and the average value of the phase errors in the second branch is obtained as "P (b1-b4)". Here, P(a1-a4) represents an average of four phase errors detected at T1, T2, T3, and T4 in the first branch, and P(b1-b4) represents an average of four phase errors detected at T1, T2, T3, and T4 in the second branch. At this time (T4), the reliability of both first and second branches is high. Therefore, in this case, the decision unit 7 outputs "{P (a1-a4)+P(b1-b4)/2}".

At the time T5, the average value of the phase errors in the first branch is obtained as "P(a2-a5)". Meanwhile, the reliability of the second branch is low at this time. In this case, the decision unit 7 outputs "P (a2-a5)" without using the information from the second branch. Meanwhile, the phase error averaging unit 3 holds the average value "P(b1-b4)" that was obtained at the time T4 in the second branch. After this, the information from the second branch is not to be used while the reliability of the second branch remains low.

It is assumed that the reliability of the second branch recovers at the time T11. At the time T11, the average value of the phase errors in the first branch is obtained as "P (a8-a11)". Meanwhile, assuming that the calculation has been continued, "P (b8-b11)" would be obtained in the second branch. However, since "b8" through "b10" are the information obtained while the reliability was low, the reliability of "P(b8-b11)" is also low. Therefore, "P(b1-b4)" that has been held in advance is used instead of "P(b8-b11)" that has been newly calculated. Therefore, the decision unit 7 outputs "{P(a8- a11)+P(b1-b4)}/2". Meanwhile, the operation returns to the normal one after the operation of the second branch becomes stable.

Thus, immediately after the reliability of a branch recovers, the reliability of the average value of the phase error in the recovered branch is low. For this reason, the OFDM receiving apparatus according to the embodiment holds the average value of the phase errors that is calculated while the reliability is high, and uses the value being held, immediately after the recovery of the branch. Application of this configuration prevents the clock correction operation from becoming unstable when a branch recovers.

FIG. 8 is a flowchart illustrating processes performed by the decision unit 7. The processes are repeatedly performed, for example, at predetermined intervals. It is assumed that the latest phase error, power and MER are notified from each branch to the decision unit 7 constantly.

In step S1, the average power in each branch is respectively compared with a threshold power value. When the average power of a branch is lower than the threshold power, the branch is determined as having low reliability. In step S2, the MER in each branch is respectively compared with a threshold MER. When the MER of a branch shows a worse rate than the threshold MER, the branch is determined as having low reliability. In step S3, the variance between the phase errors in each branch is respectively compared with a threshold variance value. When the variance between the phase errors in a branch shows a greater variance than the threshold variance value, the branch is determined as having low reliability. In this regard, even if the average value of the phase errors is small, the receiving operation is unstable when there is significant variance between the respective phase errors. Therefore, when there is significant variance between the phase errors, the reliability of the communication is determined as low.

When the reliability is high in all branches, the average of the phrase errors in all branches are combined (in the embodiment, averaged) in step S6, and the clock is corrected using the result of the combining operation. If there is any suspended phase error averaging operation circuit, the operation circuit is activated (steps S4 and S5) before the step 6 is carried out.

When a branch having a low reliability is detected, steps S7 and S8 are carried out. In the step S7, the phase error averaging operation circuit in the branch having a low reliability is suspended so as to reduce the power consumption. In the step S8, the clock error is corrected using only the average of the phase errors in the branch having high reliability. If only one branch has a high reliability, the clock error is corrected using the phase errors in the branch.

A method for correcting the clock is realized by, for example, decimating a pulse of a clock signal generated by the oscillator 22 in FIG. 4. In this case, the number of pulses to be decimated (or the frequency of decimation of a pulse) is determined based on the calculated phase error in step S6 or S8.

While the reliability of each branch is determined on the basis of the three conditions (steps S1-S3) according to the above example, the present invention is not limited to this method. In other words, the reliability of each branch may be determined on the basis of any one, or any two of the three conditions in the steps S1-S3. In addition, the reliability of each branch may be determined according to other conditions.

Thus, in the OFDM receiving apparatus according to the embodiment, the error of the clock in each branch is corrected using only the information obtained from the branch having high reliability, making it possible to maintain stable reception quality even when the quality of some branches deteriorates. In addition, when the quality of a branch declines, the last calculated data is held so that the calculated data being held can be used when the branch recovers, preventing the operation from becoming unstable with the recovery of the quality of the branch.

While an instruction for correcting the clock error is generated in accordance with the average of the phase errors in a plurality of branches having high reliability according to the example described above, this does not limit the present invention. The clock in each branch may be controlled, for example, by selecting the branch having the smallest average value of the phase errors and making the clock in the selected branch and the clock in the other branches identical. Alternatively, the clock in each branch may be controlled, by selecting the branch having the largest average power, and making the clock in the selected branch and the clock in the other branches identical. Furthermore, the clock in each branch may be controlled, by selecting the branch having the lowest MER, and making the clock in the selected branch and the clock in the other branches identical.

While an OFDM receiving apparatus having two OFDM branches is shown in the above example, the present invention is not limited to the configuration. In other words, the number of the OFDM branches is arbitrary. For example, when the reliability of a branch declines in an OFDM receiving apparatus having four branches, the phase errors in the other three branches may be combined, and the clock in each branch may be corrected in accordance with the result of the combining operation.

In the embodiment shown in FIG. 31 the decision unit 7 calculates the average of phase error values (or time phase errors), the decision unit 7 may calculate the average of the power values of MER information of each of the branches. Then the clock error correction unit 8 may issue the correction instruction according to one of the calculated average value.

As described above, an OFDM receiving apparatus of the embodiment includes a plurality of antennas; receiving systems respectively connected to each of the antennas; clock signal control units for respectively correcting a clock signal in each of the receiving systems; operation units for obtaining, in each of the receiving systems, a time phase error between a symbol starting position and a position of a reference clock signal and for obtaining an average value of the time phase errors in each of the receiving systems; and a decision unit for combining the average values obtained by the operation units in the receiving systems, wherein the decision unit controls the clock signal control units to correct the clock signal in each of the receiving systems.

In this configuration, the average values of time phase errors obtained by the operation units in a plurality of receiving systems are combined, and the clock signal in each of the receiving system is corrected in accordance with the result of the combining operation.

An OFDM receiving apparatus of another embodiment, that receives an OFDM signal using a plurality of OFDM branches, includes: a plurality of clock circuits for respectively generating a clock for the OFDM signal in each of the OFDM branches; a detector for detecting an error in a symbol interval in each of the OFDM branches; an identification unit for identifying, from the plurality of the OFDM branches, an OFDM branch that satisfies a predetermined communication condition; a correction unit for correcting, in accordance with the error in the symbol interval detected in one or more OFDM branches identified by the identification unit, a clock generated by each of the plurality of clock circuits; and a diversity circuit for combining output signals from the plurality of the OFDM branches.

According this configuration, a clock for an OFDM signal is generated in accordance with the error in the symbol interval detected in one or more of the OFDM branches. At this time, the error in the symbol interval detected in the OFDM branches that do not satisfy a predetermined communication condition (that is, the OFDM branches with low reliability) is excluded. Therefore, even when a quality of an OFDM branch deteriorates, good reception characteristics can be maintained, since the clock is corrected in accordance with the information obtained from the OFDM branch with high reliability. As a result, reception characteristics of an OFDM receiving apparatus that receives an OFDM signal using a plurality of OFDM branches is improved.

What is claimed is:

1. An OFDM (Orthogonal Frequency Division Multiplexing) receiving apparatus comprising:
   a plurality of antennas;
   receiving systems respectively connected to each of the antennas, each of the receiving systems including:
      an A/D converter to convert a signal received via a corresponding antenna into a digital signal;
      an orthogonal demodulator to demodulate the digital signal output from the A/D converter; and
      a clock recovery unit to recover a clock of the demodulated digital signal generated by the orthogonal demodulator,
   operation units to obtain, in each of the receiving systems, a time phase error between a symbol starting position and a position of a reference clock signal and to obtain an average value of the time phase errors in each of the receiving systems;
   a decision unit to combine the average values obtained by the operation units in the receiving systems; and
   a correction unit to generate a correction instruction in accordance with an output of the decision unit, wherein
   each of the clock recovery units includes a holding circuit to hold the demodulated digital signal generated by a corresponding orthogonal demodulator and a decimation unit to decimate a pulse of a clock signal generated by an oscillator according to the correction instruction generated by the correction unit, and wherein
   each of the clock recovery units recovers a clock of the demodulated digital signal by reading out the demodulated digital signal from the holding circuit using the clock signal decimated by the decimation unit.

2. The OFDM receiving apparatus according to claim 1, wherein
   the decision unit selects a receiving system outputting a smallest value in the average values obtained by the operation units in the receiving systems, and the correction unit generates the correction instruction to control the clock recovery units, so that the clock in the non-selected receiving system becomes identical with the clock in the selected receiving system.

3. An OFDM (Orthogonal Frequency Division Multiplexing) receiving apparatus comprising:
   a plurality of antennas;
   receiving systems respectively connected to each of the antennas, each of the receiving systems including:
      an A/D converter to convert a signal received via a corresponding antenna into a digital signal;
      an orthogonal demodulator to demodulate the digital signal output from the A/D converter; and
      a clock recovery unit to recover a clock of the demodulated digital signal generated by the orthogonal demodulator,
   power detectors to respectively calculate an average power value of the demodulated digital signals in each of the receiving systems;
   a decision unit to compare the average power values obtained respectively in each of the receiving systems; and
   a correction unit to generate a correction instruction in accordance with the average power values obtained in each of the receiving systems, wherein
   each of the clock recovery units includes a holding circuit to hold the demodulated digital signal generated by a corresponding orthogonal demodulator and a decimation unit to decimate a pulse of a clock signal generated by an oscillator according to the correction instruction generated by the correction unit, and wherein
   each of the clock recovery units recovers a clock of the demodulated digital signal by reading out the demodulated digital signal from the holding circuit using the clock signal decimated by the decimation unit.

4. The OFDM receiving apparatus according to claim 3, wherein
   the decision unit selects a receiving system outputting a largest value in the average values obtained by the power detectors in the receiving systems, and the correction unit generates the correction instruction to control the clock recovery units, so that the clock in the non-selected receiving system becomes identical with the clock in the selected receiving system.

5. An OFDM (Orthogonal Frequency Division Multiplexing) receiving apparatus comprising:
   a plurality of antennas;
   receiving systems respectively connected to each of the antennas, each of the receiving systems including:
      an A/D converter to convert a signal received via a corresponding antenna into a digital signal;
      an orthogonal demodulator to demodulate the digital signal output from the A/D converter;
      a clock recovery unit to recover a clock of the demodulated digital signal generated by the orthogonal demodulator; and
      a Fourier transform circuit to perform Fourier transform for the demodulated digital signal and to output an OFDM signal in a frequency domain,
   a MER (Modulation Error Rate) calculator to calculate modulation error rates in each of the receiving systems;
   a decision unit to compare the modulation error rates in each of the receiving systems; and
   a correction unit to generate a correction instruction in accordance with the modulation error rates in each of the receiving systems, wherein
   each of the clock recovery units includes a holding circuit to hold the demodulated digital signal generated by a corresponding orthogonal demodulator and a decimation unit to decimate a pulse of a clock signal generated by an oscillator according to the correction instruction generated by the correction unit, and wherein
   each of the clock recovery units recovers a clock of the demodulated digital signal by reading out the demodulated digital signal from the holding circuit using the clock signal decimated by the decimation unit.

6. The OFDM receiving apparatus according to claim 5, wherein
   the decision unit selects a receiving system outputting a lowest modulation error rate, and the correction unit generates the correction instruction to control the clock recovery units, so that the clock in the non-selected receiving system becomes identical with the clock in the selected receiving system.

7. An OFDM (Orthogonal Frequency Division Multiplexing) receiving apparatus that receives an OFDM signal using a plurality of OFDM branches, the OFDM receiving apparatus comprising:
    a plurality of antennas;
    a plurality of receiving systems respectively provided in a corresponding OFDM branch, each of the receiving systems including:
        an A/D converter to convert the OFDM signal received via a corresponding antenna into a digital signal;
        an orthogonal demodulator to demodulate the digital signal output from the A/D converter; and
        a clock recovery unit to recover a clock of the demodulated digital signal generated by the orthogonal demodulator,
    a detector to detect an error in a symbol interval in each of the OFDM branches;
    a decision unit to identify, from the plurality of the OFDM branches, an OFDM branch that satisfies a predetermined communication condition;
    a correction unit to generate a correction instruction, in accordance with the error in the symbol interval detected in one or more OFDM branches identified by the decision unit; and
    a diversity circuit to combine output signals from the plurality of the OFDM branches, wherein
    each of the clock recovery units includes a holding circuit to hold the demodulated digital signal generated by a corresponding orthogonal demodulator and a decimation unit to decimate a pulse of a clock signal generated by an oscillator according to the correction instruction generated by the correction unit, and wherein
    each of the clock recovery units recovers a clock of the demodulated digital signal by reading out the demodulated digital signal from the holding circuit using the clock signal decimated by the decimation unit.

8. The OFDM receiving apparatus according to claim 7, wherein
    the decision unit identifies the OFDM branch in which an amount of variance in the symbol interval detected by the detector is smaller than a predetermined value.

9. The OFDM receiving apparatus according to claim 7, further comprising a power detector to detect power of an received signal in each of the OFDM branches, wherein
    the decision unit identifies the OFDM branch in which the power detected by the power detector is higher than a predetermined value.

10. The OFDM receiving apparatus according to claim 7, further comprising an error rate detector to detect an error rate for a frequency domain signal obtained by performing Fourier transform on a received signal in each of the branches, wherein
    the decision unit identifies the OFDM branch in which the error rate detected by the error rate detector is lower than a predetermined value.

* * * * *